Nov. 6, 1928.  
T. S. KEMBLE  
1,690,414  
CONTACTOR  
Filed July 18, 1924   2 Sheets-Sheet 1

Thos. S. Kemble  
Inventor

By Attorneys Dodson & Roe

Nov. 6, 1928.  T. S. KEMBLE  1,690,414

CONTACTOR

Filed July 18, 1924    2 Sheets-Sheet 2

Thos. S. Kemble
Inventor

By Attorneys Dodson & Roe

Patented Nov. 6, 1928.

1,690,414

UNITED STATES PATENT OFFICE.

THOMAS S. KEMBLE, OF CLEVELAND, OHIO, ASSIGNOR, BY MESNE ASSIGNMENTS, TO UNIVERSAL GAS ELECTRIC COMPANY, OF LAWRENCE, KANSAS, A CORPORATION OF DELAWARE.

CONTACTOR.

Application filed July 18, 1924. Serial No. 726,681.

It is well known in using devices of this type that commutator segments are frequently burned, due to the arcing as the brush passes from one segment to the other. This is a constant source of expense and a considerable fire hazard.

My invention has for its object the use of a contactor with a controller to eliminate this objectionable feature and I accomplish the object by placing a mechanical contactor in the main circuit and replacing the common notch locating and positioning star wheel by a contactor operating star wheel arranged to be in contact when the roller is in the notch and to break the contact when and as the roller passes over the points of the star. The result of this is that no current can flow while the brush passes from one segment to the other and the contactor and its operating mechanism are made to serve the double purpose of eliminating the segment burning, and also of positioning the controller drum.

My invention eliminates the above mentioned objectionable features in connection with rheostat control such as may be used in connection with regenerative braking on electric-drive vehicles by providing a contactor in series electrically between two segments or contact parts of the controller, said segments or contact parts being arranged close together but insulated from each other and being so arranged that a finger makes contact first with one segment which we may designate as the secondary segment, then with the other segment which we may designate as the primary segment, then leaves contact with the secondary segment. The primary segment is connected into the electrical system where connection with the finger is desired. The secondary segment is connected to the contactor only, so that no current can flow through the secondary segment while the contactor is open.

It may be desirable to provide the finger with a wide brush to bridge the gap between the two segments so as to make good electrical contact with one segment while it maintains contact with the other segment or it may be desirable for mechanical reasons to provide the finger with two brushes in parallel electrically to afford perfect contact with both segments simultaneously. This would constitute a mechanical detail only and not an element vital to the principle of operation.

The contactor is operated in synchronism with the controller and is so arranged that it is open when the finger makes contact with secondary segment, closes connecting secondary and primary segments electrically after said contact is made, remains closed while finger makes contact with the primary segment and opens after the finger makes contact with the primary segment.

My invention further provides a contactor mechanism which involves very positive wiping contact with quick make and break but with small inertia forces so that it may be operated at high or low speed without the necessity for stiff springs which tend to fatigue the operator and involve undue wear or expense. When currents are heavy, it is intended to use magnetic blowout coils in connection with the contactors but they are well known in the art and are not essential to my principle of operation and are therefore not shown in the drawings.

My invention further provides simple means for operating both the main controller and the braking controller through a single lever, thereby simplifying the control operation and to considerable extent eliminating necessity for skill on the part of the operator.

While it might appear more simple to include all control in a single controller and thus do away with the means of operation here proposed, in many cases, however, practical considerations call for limited travel of the controller-handle and for many brushes and controller steps, which combination makes controller operation burdensome. The effect, then, of dividing into two controllers with the proposed type of operation, will be understood from the following example:

Assume a controller which has twenty steps and twenty brushes, which may be divided into two controllers with ten steps and with fifteen brushes each, and assume further that controller-handle travel is limited to twenty inches.

With the single controller, the controller-handle travel will be one inch per step.

With the two controllers, the controller-handle travel per step will be doubled, cutting the force required in half.

The number of brushes offering resistance at any one time has been reduced from twenty to fifteen, cutting the total resistance to three quarters of what it was with the single controller.

The number of steps per controller has been reduced by one-half, and it is safe to assume that the drum diameter will be reduced at least to three quarters of what it was with the single controller, thus reducing the effective brush resistance again by three quarters.

The force required to move the controller-handle will then be reduced to ½ times ¾ times ¾ or $\frac{9}{32}$ of that required to operate the single controller handle.

The desirability of simple means such as I have invented for accomplishing this effect, is therefore obvious.

My means of accomplishing the forgoing objects may be more readily understood by having reference to the accompanying drawings in which.

Similar reference numerals refer to similar parts throughout the entire description.

Figure 3:
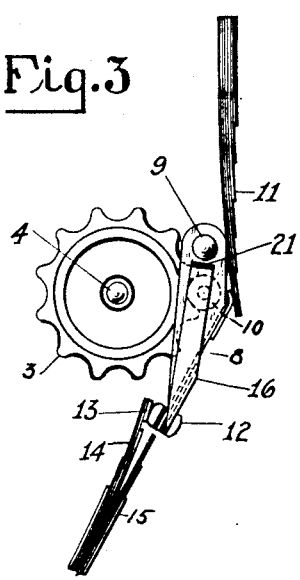
Fig. 3 is an end view of the main controller drum contactor and contactor operating mechanism.
Figure 1:
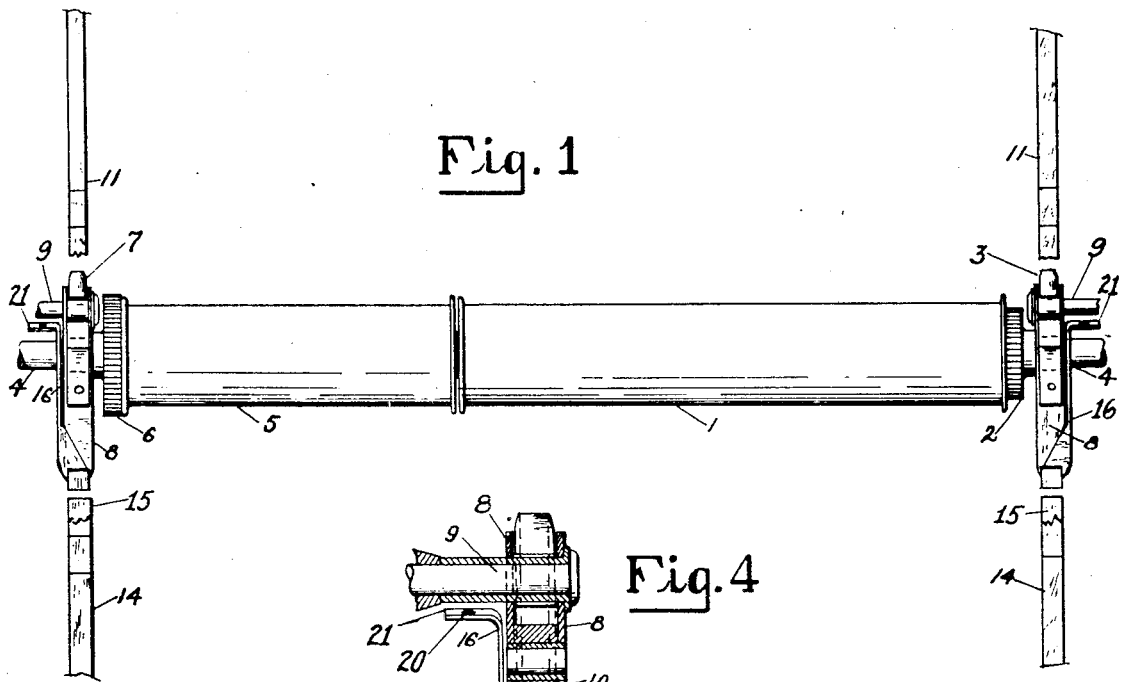
Fig. 1 is a plan view of an arrangement of main controller drum, braking controller drum and contactors embodying the invention described.

As shown in the drawings the main controller drum 1, together with its actuating gear 2 and its contactor operating star wheel 3 (Fig. 3), are mounted to rotate as a unit on the stationary supporting shaft 4.

Figure 2:
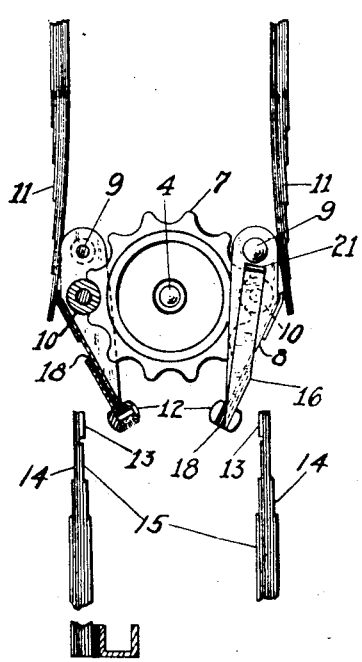
Fig. 2 is an end view of the braking or rheostat controller drum contactors and operating mechanism.

The braking controller drum 5, together with its actuating gear 6 and its contractor operating star wheel 7 (Fig. 2), are mounted to rotate as a unit and independently of the rotation of the main controller drum on the stationary supporting shaft 4.

Figure 4:
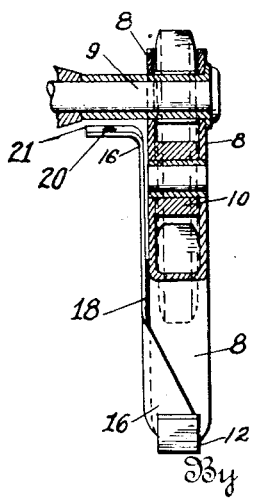
Fig. 4 is an enlarged end view in partial section of one contactor moving member.

The moving arms 8 are pivoted on the pin 9 (Fig. 4), and are actuated by the star wheels 3 and 7 through the rollers 10 and by the springs 11.

The double-headed contactor buttons 12 are insulated from the moving arm 8 which is a sheet metal stamping, but are in contact with the conductor 16 which is of sheet metal and is insulated from the moving arm 8 and is adapted to be connected to a flexible conductor (not shown) at a point 20 close to the pivot 9 so as to provide for minimum motion of the flexible conductor.

The double-headed contactor buttons 12 make contact with the contactor buttons 13 when the roller 10 is in the notches of the contactor operating star wheel 3 in connection with the main controller drum 1 and when the rollers 10 are passing over the teeth between the notches of the operating star wheel 7 in connection with the braking controller drum 5.

The contactor buttons 13 are spring mounted on the springs 14 to provide a permanent wiping contact during the predetermined required period of contact. The contactor buttons 13 may be connected into the circuit through the insulated spring mounting as shown or may be connected through a flexible conductor (not shown).

The springs 15 are further provided in opposition to the springs 14 in such a way as to assist in absorbing the inertia of the springs 14 with the contact buttons 13 as they follow the retreating contact buttons 12 and to assist in throwing them in a direction opposite to the motion of the retreating contact buttons 13 causing a quick break.

Figure 5:
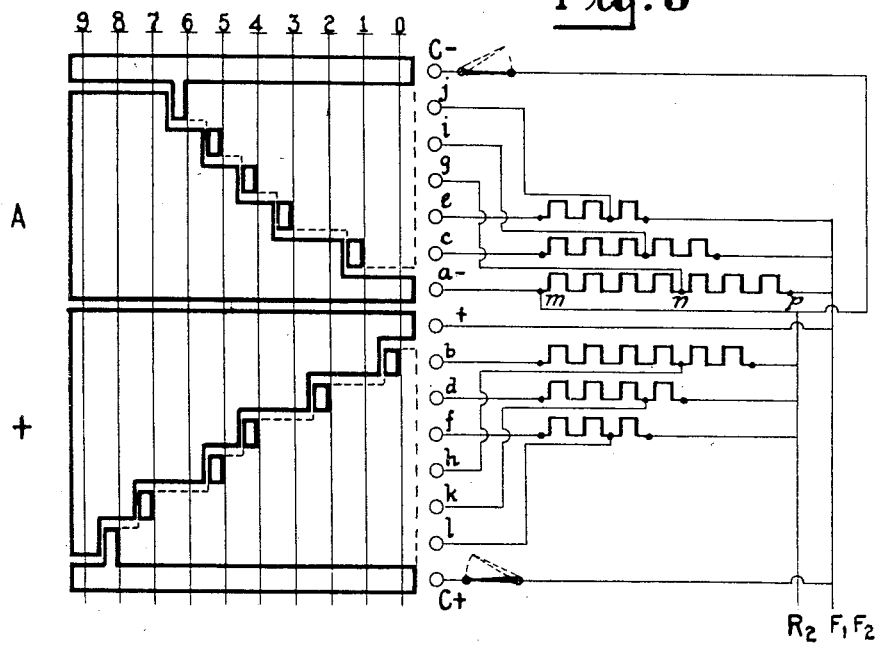
Fig. 5 is a diagrammatic illustration of the resistances, contactors, braking controller drum segments and electrical connections.

When the contactor is to be used in connection with the braking controller (referring to the diagrams Fig. 5), if we assume the braking resistances and controller are connected, as shown in the diagram, and the contactors C− and C+ arranged to be open for a period centering on the notch and closed for the period centering between the notches. Then in notch O, brush $a-$, which connects with $R_2$ on the main controller and with an end of the resistance $mnp$, is in contact with segment A; while the plus brush is connected to the other end of the resistance $mnp$ and to brush $F_1$, $F_2$ on the main controller. Under this arrangement the resistance $mnp$ is in series in the motor circuit.

As the controller drum moves toward notch 1 the brush $b$ passes on to the narrow or secondary segment connected with the contractor C+, which is still open. Then C+ closes and remains closed while brush $b$ passes from the said narrow or secondary segment to the plus or primary segment, after which the contactor C+ again opens. The brushes and segments are so arranged that the brush holds contact with the narrow or secondary segment until after it makes contact with the primary or plus segment and as these two segments have the same potential it necessarily follows that no arcing occurs. The next brush to make contact is $c$ in like manner, and cooperates with contactor C−.

Contactors C+ and C− are arranged to open and close together so that either or both of them can be used on any notch with the result that there is no unevenness in the resistance to the operation of the controller lever. They both operate from the same star wheel and they act to make positive notches as has been heretofore described in connection with the main controller contactor. It is also obvious that the contactors will function equally well with either direction of rotation of the drum.

Use of contactor in connection with main controller.

Burning of commutator segments due to arcing as brush passes from one segment to another is source of expense and fire hazard.

By placing a magnetic blow out contactor in the main circuit this may be eliminated simply even with heavy currents as follows:

Replace the common "notch locating" star wheel by a contactor operating star wheel arranged to be in contact when roller is in notch and to break contact as roller passes over the points of the star. Then no current will flow while brush passes from one segment to another and the contactor and its operating mechanism are made to serve the double purpose of eliminating segment burning and of positioning the controller drum.

Figure 6:
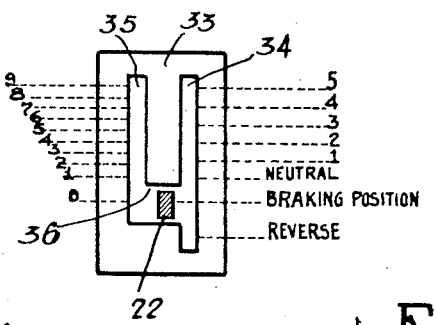
Fig. 6 is a diagrammatic view showing the various positions for the controller handle.
Figure 7:
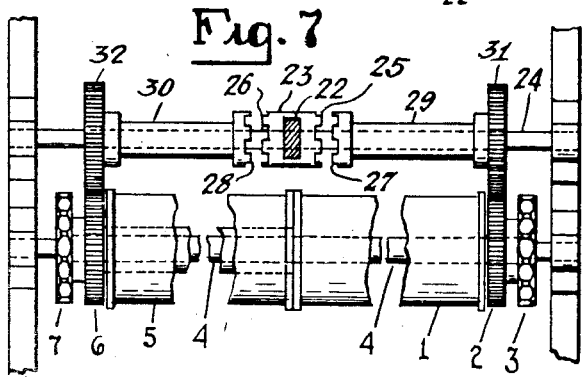
Fig. 7 is a plan view of main controller, braking or rheostat controller and operating mechanism with single controller-handle for operating both controllers.
Figure 8:
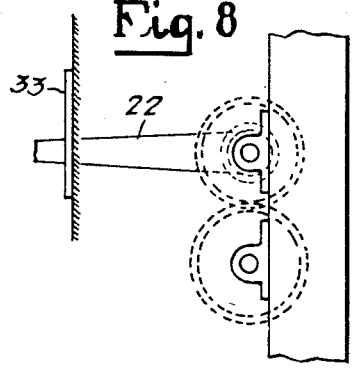
Fig. 8 is a diagrammatic end view of same.

In Figs. 6, 7 and 8, the controller handle 22 is rigidly connected to the hub 23 which is slidably and rotatably mounted on the stationary shaft 24. The hub 23 is provided with jaws 25 and 26 arranged to engage the jaws 27 and 28 on the tubes 29 and 30 by sliding the hub 23 endwise on the stationary shaft 24.

Pinion 31 is fastened to tube 29 and engages gear 2 on the main controller drum 1. Pinion 32 is fastened to tube 30 and engages gear 6 on braking controller drum 5. The gated or slotted quadrant 33 is provided to guide controller-handle 22. The gate or slot 34 guides controller-handle 22 keeping jaws 25 in engagement with jaws 27 for operating the main controller drum 1. The gate or slot 35 guides controller-handle 22 keeping jaws 26 in engagement with jaws 28 for operating controller drum 5. The gate or slot 36 provides passageway for controller-handle 22 between slots 34 and 35 and is so positioned that main controller drum 1 must be moved to a predetermined suitable notch before braking controller drum 5 can be operated.

While I have described a specific form of construction for my invention it will be understood that this is merely for the purpose of illustrating a concrete embodiment of the invention, and I do not wish to be understood as limiting myself to the details of construction shown and described, for they are furnished only for illustrative purposes, and many other forms may be employed without departing from the scope or spirit of my invention.

Having described my invention what I regard as new and desire to secure by Letters Patent of the United States is:

1. A contactor comprising a star wheel, pivoted arms, rollers engaging said star wheel, springs carrying said rollers, double-headed contactor buttons, mounted on said springs, said springs being insulated from the pivoted arms, a sheet metal conductor in contact with said buttons, a flexible conductor connected to said sheet metal conductor close to the pivot to provide for minimum motion of said flexible conductor.

2. The combination in a contactor of a pivoted arm, a contact surface mounted on said pivoted arm, a spring, a second contact surface mounted on said spring, a star wheel for actuating said pivoted arm to bring said first mentioned contact surface in contact with said second contact surface compressing said spring and to return said first mentioned surface out of contact with said second contact surface by movement opposite in direction to the first movement, a manually operated lever, and means to cause the movement of said lever to rotate said star wheel.

3. The combination in a contactor of a pivoted arm, a contact surface mounted on said pivoted arm, a spring, a second contact surface mounted on said spring, means for actuating said pivoted arm to bring said first mentioned contact surface in contact with said second contact surface compressing said spring and to return said first mentioned surface out of contact with said second contact surface by movement opposite in direction to the first movement; a second spring mounted in opposition to said first mentioned spring to assist in absorbing the inertia of said first mentioned spring as said second contact surface follows said first mentioned contact surface during its return, and to assist in throwing said second contact surface in a direction opposite to that of the retreating first mentioned contact surface to cause a quick break.

4. A contactor comprising a star wheel, a pivoted arm, a surface on said arm engaging said star wheel, a spring engaging said arm to hold said surface in engagement with said star wheel, a conductor and contact surface mounted on said arm and insulated therefrom, a spring-mounted contact surface arranged to form yielding and wiping contact with the arm-mounted contact surface for predetermined positions of said arm and to be out of contact for other predetermined positions of said arm, a shaft on which said star wheel is mounted, a gear on said shaft, a second shaft, a gear mounted thereon in mesh with the first mentioned gear, and means to rotate said second shaft and through it the star wheel.

5. A contactor comprising a star wheel, a pivoted arm, a surface on said arm engaging said star wheel, a spring engaging said arm to hold said surface in engagement with said star wheel, a conductor and contact surface mounted on said arm and insulated therefrom, means for connecting a flexible conductor to said conductor close to the pivot to provide minimum motion of said flexible conductor, a spring-mounted contact surface arranged to form yielding and wiping contact with the arm-mounted contact surface for predetermined positions of said arm and to be out of contact for other predetermined positions of said arm.

6. A contactor comprising a star wheel, a pivoted sheet metal arm, a roller mounted on said arm and engaging said star wheel, a spring engaging said arm to hold said roller in engagement with said star wheel, a contact button and sheet metal conductor mounted on said arm and insulated therefrom, means for connecting a flexible conductor to said sheet metal conductor close to the pivot to provide minimum motion of said flexible conductor, a spring-mounted contact button arranged to form yielding and wiping contact with said first mentioned contact button for predetermined positions of said arm and to be out of contact for other predetermined positions of said arm.

7. The combination in a contactor mechanism of a pivot, an arm mounted on said pivot said pivot being located at one end of said arm, a contact piece mounted on the other end of said arm, a conductor mounted on said arm, said contact piece and said conductor being in electrical connection with each other and being insulated from said arm, a roller pivotally mounted on said arm between the ends of said arm, a notched member adapted to engage said roller to cause rotative motion of said arm about said pivot on which said arm is mounted, a spring adapted to engage said arm to hold said roller in engagement with said notched member, a spring-mounted contact piece adapted to make yielding wiping contact with said first mentioned contact piece for predetermined positions of said notched member.

8. In combination, a supporting shaft upon which is mounted a controller, and a second controller to rotate independently a lever adapted to selectively operate either the first or second mentioned controller, a secondary shaft on which said lever is mounted, means to prevent said lever from operating said second controller except when said first mentioned controller is in suitable predetermined position.

9. In combination, a controller, a second controller, a lever adapted to operate the first mentioned controller and adapted to operate said second controller, a gated quadrant arranged to prevent said lever from operating said second controller except when said first mentioned controller is in suitable predetermined position.

10. In combination, a contactor, a cylindrical controller, contact segments on said controller, a finger adapted to make contact with a segment on said controller and adapted to make contact with a circumferentially adjacent segment on said controller, said contactor being arranged in series electrically between said first mentioned segment and said circumferentially adjacent segment, operating mechanism arranged to hold said contactor open while said finger makes contact with said first mentioned segment and whereby said contactor is closed while said finger is in contact with said first mentioned segment and remains closed while said finger makes contact with said circumferentially adjacent segment.

11. In combination, a contactor, a cylindrical controller, contact segments on said controller, a finger adapted to make contact with a segment on said controller and adapted to make contact with a circumferentially adjacent segment on said controller, said contactor being arranged in series electrically between said first mentioned segment and said circumferentially adjacent segment, operating mechanism arranged to hold said contactor open while said finger makes contact with said first mentioned segment and whereby said contactor is closed while said finger is in contact with said first mentioned segment and remains closed while said finger makes contact with said circumferentially adjacent segment, and whereby said contactor is opened while said finger is in contact with said circumferentially adjacent segment.

12. In combination, a controller, a contact part on said controller, a second contact part on said controller, a third contact part on said controller, said first mentioned contact part being adapted to make successive contact with said second contact part and said third contact part, a make-and-break switch, electrical connections placing said make-and-break switch in series between said second contact part and said third contact part, mechanism adapted to operate said controller and said switch whereby said make-and-break switch is held open while said first mentioned contact part makes contact with said second contact part and whereby said make-and-break switch is closed while said first mentioned contact part is in contact with said second contact part and whereby said make-and-break switch is held closed while said first mentioned contact part makes contact with said third contact part.

13. In combination, a controller, a contact part on said controller, a second contact part on said controller, a third contact part on said controller, said first mentioned contact part being adapted to make successive contact with said second contact part and said third contact part, a make-and-break switch, electrical connections placing said make-and-break switch in series between said second contact part and said third contact part, mechanism adapted to operate said controller and said switch whereby said make-and-break switch is held open while said first mentioned contact part makes contact with said second contact part and whereby said make-and-break switch is closed while said first mentioned contact part is in contact with said second contact part and whereby said make-and-break switch is held closed while said first mentioned contact part makes contact with said third contact part and whereby said make-and-break switch is opened while said first mentioned contact part is in contact with said third contact part.

THOS. S. KEMBLE.